(12) United States Patent
Huggins (10) Patent No.: US 6,545,863 B2
(45) Date of Patent: Apr. 8, 2003

(54) COMPACT CONFIGURABLE COMPUTER AND MIXED MEDIA WORKSTATION AND ENCLOSURE

(76) Inventor: John M. Huggins, 15595 Lewis Rd., Nevada City, CA (US) 95959

( * ) Notice: Subject to any disclaimer, the term of this patent is extended or adjusted under 35 U.S.C. 154(b) by 204 days.

(21) Appl. No.: 09/766,829

(22) Filed: Jan. 18, 2001

(65) Prior Publication Data

US 2002/0030966 A1 Mar. 14, 2002

Related U.S. Application Data

(60) Provisional application No. 60/177,497, filed on Jan. 21, 2000.

(51) Int. Cl.[7] ................................................. G06F 1/16
(52) U.S. Cl. ....................... 361/683; 361/726; 361/727; 312/223.3; 312/7.2
(58) Field of Search ................................ 361/679–686, 361/721–727; 312/223.1–223.3, 7.2

(56) References Cited

U.S. PATENT DOCUMENTS

| | | | |
|---|---|---|---|
| 4,688,862 A | | 8/1987 | Fowler et al. ............... 312/325 |
| 5,130,494 A | | 7/1992 | Simonton et al. ............ 174/48 |
| 5,303,057 A | * | 4/1994 | Davidow et al. ............ 312/7.2 |
| 5,489,938 A | * | 2/1996 | Maruyama et al. ......... 312/223.3 |
| 5,558,418 A | * | 9/1996 | Lambright et al. ........ 312/223.3 |
| 5,746,488 A | | 5/1998 | LaCour ....................... 312/196 |
| 5,829,130 A | * | 11/1998 | Miller .......................... 29/868 |
| 5,842,758 A | * | 12/1998 | Kelley ....................... 312/223.3 |
| 5,951,128 A | * | 9/1999 | Aidone et al. ............. 312/223.3 |
| 5,993,216 A | * | 11/1999 | Stogner ..................... 312/223.2 |
| 6,158,829 A | * | 12/2000 | Nielsen ..................... 312/223.3 |
| 6,382,745 B1 | * | 5/2002 | Adkins ..................... 312/223.3 |
| 6,400,561 B1 | * | 6/2002 | Horton ......................... 361/683 |

FOREIGN PATENT DOCUMENTS

FR       2598305 A3  * 11/1987   ........... A47B/21/02

* cited by examiner

*Primary Examiner*—Darren Schuberg
*Assistant Examiner*—Lisa Lea-Edmonds
(74) *Attorney, Agent, or Firm*—Thomas, Kayden, Horstmeyer & Risley (57) ABSTRACT

A compact configurable computer and mixed media workstation and enclosure designed for housing a plurality of integrated and user-provided electronic and mixed-media devices, an internal power supply, and connection cables. Said workstation and enclosure being essentially a six-sided hollow structure defined with various chambers and levels, a slide out shelf which extends from bottom of enclosure, a wing shelf which extends from opposing sides of said enclosure and provides a user work surface and a note tray and with electronics assemblies and a note taking element incorporated into said wing shelf.

The top of the enclosure is characterized with a split top, where a front section is hingedly attached to the enclosure and folds forward to reveal an interior user work surface and a lower, forward work surface, and where a rear section may be configured to fold back to reveal an access door to a power and cable containment chamber. All chambers are latchable with single-throw mechanism. The enclosure is further intermated with a shell cover and container stand to store, transport and protect the enclosure; said stand also configurable as a positionable stand on which to place said enclosure for use.

45 Claims, 8 Drawing Sheets

COMPACT CONFIGURABLE COMPUTER AND MIXED MEDIA WORKSTATION AND ENCLOSURE

CROSS-REFERENCE TO RELATED APPLICATION

This application claims the benefit of U.S. provisional application Ser. No. 60/177,497, filed Jan. 21, 2000, and entitled, "Compact Configurable Computer Mixed Media Enclosure," the contents of which are hereby incorporated by reference in their entirety.

TECHNICAL FIELD

The present invention generally relates to a compact, configurable computer and mixed media workstation and enclosure and, more particularly, relates to compact and readily configurable enclosures with primary application to workstations for electronic computer-assisted presentations, network-based meetings, remote training stations, and standing computer stations. The present invention also relates to office furniture with configurable shelves, transcription note holders, securing and locking mechanisms, or electrical power distribution facilities.

BACKGROUND OF THE INVENTION

Electronic mixed-media meeting workstations and enclosures driven by hardware and network technologies are well known. Important enabling network and Internet technologies for this invention include "streaming" data transmission and rendering formats for remote audio and video feeds, which allow remote user terminals to buffer and display or playback delayed content continuously, but prior to transmission of complete programs. Furthermore, the transmission rates required for "real time" audio and video feeds have been dramatically reduced, in some cases by more than two orders of magnitude, by aggressive but standardized data compression algorithms. Most modem personal computers contain decoders and network protocol handlers that allow such remote content to be displayed with conventional "browsers" embellished with multimedia players and "add-in" software. In this way, audiographics, consisting of audio, still images, documents, and motion images may be effectively transmitted, bidirectionally, from one room to another over corporate networks, and from one site to another over narrowband Internet and intranet facilities. However, the delays associated with computer networks and particularly the internet, and with the buffered "streaming" audio formats previously mentioned, complicate the simultaneous transmission and synchronization of real-time audio with associated graphical materials. For this reason, modern multimedia workstations used for net-conferences and "web conferences" and "web casting", often employ parallel simultaneous telephone or conference (hands-free) telephone connections for transmission of real time voice and audio material associated with the network-borne graphical material. Such telephone conferencing capability has not to date been implemented in a compact integrated mixed media workstation.

Modern personal computers, even portable computers typically contain hardware media players such as compact disk (CD) and digital versatile disk (DVD) players. This allows non-resident audio, graphics, and video content on CDs and DVDs to be played using the inherent facilities of a personal computer.

Until now, the personal computer on an individual's desk, has dominated the model for e-meeting client terminals. This need for an individual workstation is addressed with personal computers that now conventionally come equipped with speakers, large display monitors, integrated network connections, and modems. Business collaboration in the corporate conference and training room, driven by the network and Internet technologies, mentioned above, and by other technologies such as miniaturized data projectors and document cameras for displaying images and video program material on large screens, will increasingly involve at least one site with multiple attendees. Examples of types of business collaboration needs include remote client presentations, remote sales meetings, remote business presentations, remote design reviews, and the like. Separate business infrastructure, such as is deployed by subscription network-meeting hosting businesses, has developed to facilitate these "one to many" electronic meetings. These trends clearly anticipate escalating demand for scheduled e-meetings that will increasingly draw corporate attendees away from their individual desks and PC's to local clusters for remote meetings, distance learning, training, and collaboration. The adoption in 1999–2000 of interoperable industry consensus standards (H323) for network-based teleconferencing and telecollaboration will accelerate the need for multi-client terminals for display and remote multi-participant attendance at network meetings.

Thus, new models for telecollaboration client terminals are needed for co-locating and integrating miniaturized data projectors, professional audio mixers and speakers, flat-panel monitors, conferencing speaker phones, collaboration software, and other communication aids together with control and presentation consoles for the meeting facilitators. These new terminals should be capable of securing and interconnecting, without deconfiguring, all forms of mixed-media electronics and accessories, and should be presentation-ready when not in use. The terminals should be adaptable to various meeting and audience formats and configurations, such as small to large audience (which affects display and audio configurations) and display-only versus presentation format (which affects required user spaces and surfaces and the direction/orientation of the terminal). Such terminals should be relocatable and storable, thus facilitating the sharing of costly preconfigured equipment housed in such terminals among multiple satellite conference and meeting rooms in a large facility or institution.

Current solutions consist either of custom, one-of-a-kind professionally wired conference rooms, or a component system involving display carts, with separate video, audio, network interface, and computer configurations. These component systems may include customized or build-to-specification speaker lecterns or podiums having unsecured surface space for placing speaker paraphernalia and a portable computer, bezels for housing conventional cathode ray display terminals (visible to a speaker rather than to an audience), shelves and power distribution receptacles reserved for unspecified electronics, and, optionally, a public address system for combining microphone and computer-based audio content. Some lecterns are configured as portable "loudspeakers in a box," but lack facilities for housing any personal computers, accessories, or multimedia components beyond microphones, amplifiers, and speakers.

The prior art mixed-media workstations also lack adequate embedded, integrated handsfree telephone-speakerphone apparatus, as well as other media accessories and facilitation, such as image and motion image projector, portable personal computer and media players, audio mixer and amplifier, and high fidelity speakers. Accordingly, there is a need to integrate such a handsfree telephone-speakerphone equipped with repertoire dialing, network connection, and specifically with direct connections of the telephone-speakerphone apparatus to a selectively locatable external microphone and to repositionable, detachable speakers. The additional functionality provided by such integration is novel in the context of the application of said workstation in multiple-participant environments which would benefit from the improved reconfigurability and relocatability and acoustic benefits of the workstation.

Thus, a heretofore unaddressed need exists in the industry to address the aforementioned deficiencies and inadequacies.

SUMMARY OF THE INVENTION

A compact, configurable, personal computer and mixed media workstation and enclosure, houses both a user-provided portable computer and embedded and user-provided electronic accessories, which facilitate electronic presentations and remote meetings. Hidden but user accessible power distribution panel and chamber for cables, cords, and power converters provide novel compression-gasket cable feed management from chamber to accessories positioned on a primary user work surface. Further, other elements relate to the provision of hideable user work surfaces, including bidirectional (left and right extensible) wing shelves, pivoting speakers and transcription notes holders, which together more than double the available user surface area compared to the closed footprint or base area of the enclosure. A single latching mechanism, capable of simultaneously securing all internal chambers, can be locked with a single locking mechanism, thereby securing all housed electronic equipment and accessories. An embedded handsfree speakerphone allows connection to external microphones and to embedded audio system including amplifier and detachable high fidelity external speakers. The rotational base of the enclosure and the hanging, detachable, repositionable speakers permit arbitrary dynamic directional re-orientation of the in-use enclosure independent of the directional orientation of the speakers. An, extensible, back-lit projection screen and frame provides an additional facility for realizing a self-contained small group presentation station when used with the housed and facilitated, but user-provided, projector.

Other systems, methods, features, and advantages of the present invention will be or become apparent to one skilled in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Figure 1:
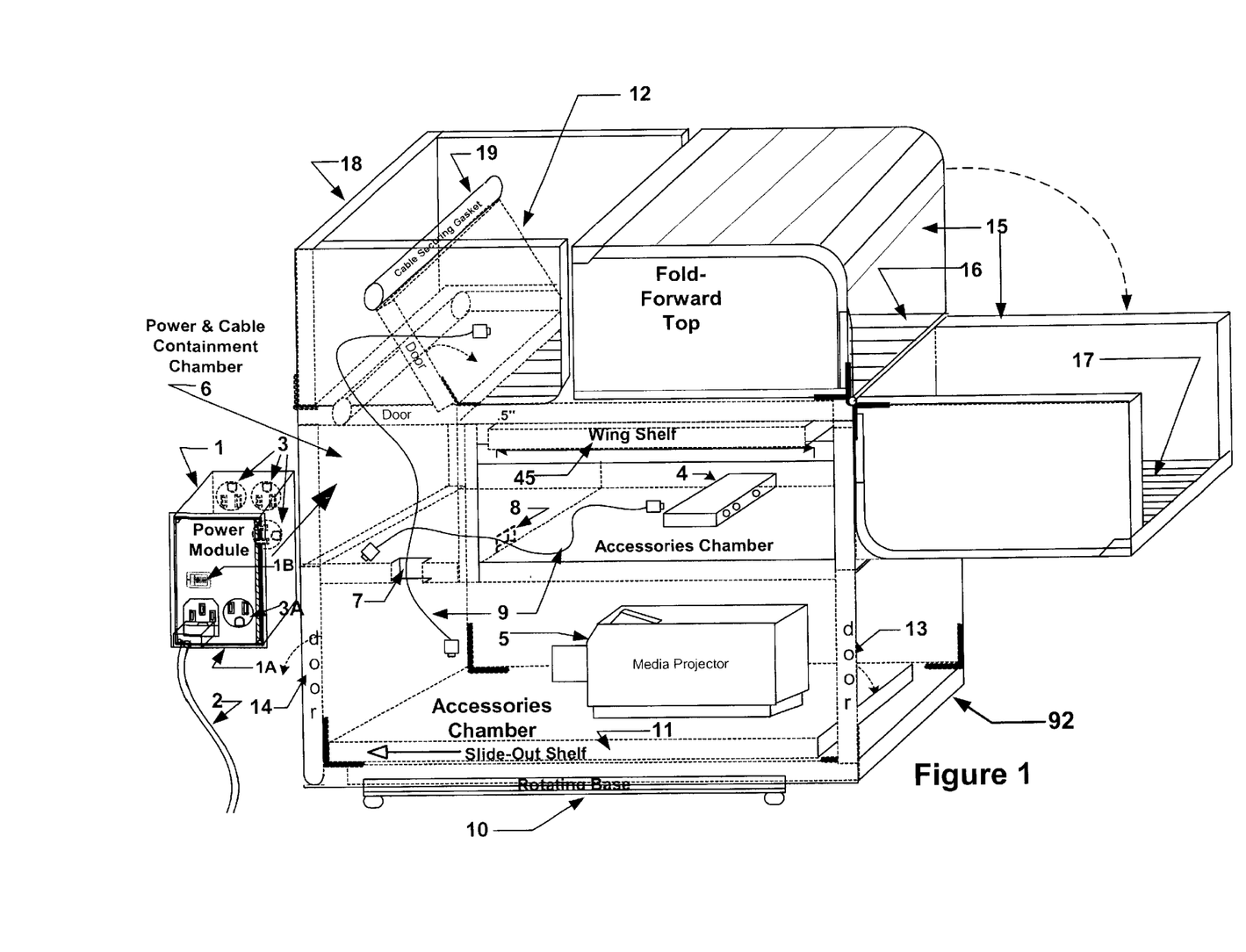
FIG. 1 is a perspective view of a computer and mixed media enclosure with interior views of the chambers, folding top section and power system.

Having summarized certain features of the invention above, reference is now made to FIG. 1, which depicts a novel, computer and mixed media enclosure constructed in accordance with the present invention. As shown, the enclosure 92 has a split top with two sections. One section is a hollow 4-sided hinged fold-forward top cover 15 which uncovers a primary interior work surface 16 (with which it does not interfere when closed), suitable for housing (when closed) and using (when open), a combination control keyboard-display device such as a portable computer. The fold-forward top cover 15 section forms a user work surface 17 in front of and below the interior user surface 16. The second section of the split top is a rear section 18, which is optionally hinged to allow it to fold back to expose rear of primary interior work surface 16 and chamber door 12 to power and cable containment chamber 6.

The internal user accessible power and cable containment chamber 6 is separated from a primary interior work surface 16 by a hinged or sliding chamber door 12, which in turn is spaced away from chamber door frame by a compressible plastic or rubber cable securing gasket 19 mounted along at least one edge of either the chamber access door 12 or door frame. When the chamber door 12 is closed, the cable securing gasket 19 secures, by method of gasket compression, multiple cables and cable sizes at an infinite number of positions along the gasketed edge of the chamber access door 12. The cables pass between the power and cable containment chamber 6 and primary interior work surface 16 area, such that when the chamber door 12 is open, the cables may be freely and optimally positioned between the power and cable containment chamber 6 and their respective connected electronic equipment contained in the primary interior work surface 16 area.

As illustrated in the preferred embodiment shown in FIG. 1, a compact configurable mixed-media enclosure 92 with integrated a.c. main power distribution module 1 with external power cord 2 and interior a.c. power connectors 3 for embedded 4 or user-provided 5, housed electronic equipment. The power distribution module 1 is of conventional electrical design, similar to many commercial "power tap" designs, and is housed in a small metal box as shown, optionally containing internal components such as Metal Oxide Varistors (MOV) and high voltage capacitors for electrical surge protection. The module 1 mounts into the enclosure 92 as illustrated, with one side of the module 1 realized by a cosmetically attractive panel or faceplate 1A which mounts approximately "flush" with or slightly offset from the corresponding external surface of the enclosure 92. The faceplate 1A contains standard panel mount components, such as the receptacle for external power cord 2, as well as appropriate indicator lights or light emitting diodes (not shown) and a high voltage (110–230 volt a.c.) switch for quickly and safely enabling and disabling power to the enclosure. In the preferred embodiment shown in FIG. 1, externally facing a.c. power connector 3A is provided as a "courtesy plug" for external provision of switched a.c. power to external equipment.

An internal user accessible power and cable containment chamber 6 with cord and cable "drops" 7 and "feedthrough" openings 8 between the chamber 6 and all interior spaces for housing and hiding a.c. power cords, a.c. to d.c. converters, equipment connection cables 9, and/or communications cables permitting wholly internal (within the enclosure 92) interconnection of enclosed equipment.

In the preferred embodiment shown, the power and cable containment chamber may be situated within an enclosure 92. The chamber 6 is effectively a 6-sided hardwood or metal box with a cover at the top, which cover when closed forms a horizontal surface which is part of a primary interior work surface 16, and which cover 12 provides user access for cables, connectors and power supply converters. The chamber 6 contains a cutout for power distribution module 1 which mounts along one outer-facing side. It should be evident that in the preferred embodiment, three sides of the chamber 6 are implemented by external walls of the enclosure 92; however, the chamber 6 could be implemented by a distinct, 6-sided box with all features previously described.

The enclosure 92 is also a 6-sided structure having cosmetically enhanced and finished external surfaces, such as finished solid or veneered hardwood external surfaces or mixed hardwood-painted metal surfaces and joints. The preferred embodiment of the enclosure utilizes a bent and joined internal sheetmetal structure for all described elements, with this sheetmetal structure serving both to enclose and provide internal structure for the internal chambers, and to provide a structurally strong frame on which a plurality of cosmetic panels of various finishes, designs, and materials may be individually attached, detached, and replaced.

The enclosure 92 has an integrated rotating base 10 capable of continuous rotation, of approximately plus and minus 180 degrees, to allow the enclosure 92 to be positioned arbitrarily in its rotational plane. For example, the enclosure 92 may be placed toward an audience or toward a projector display screen.

Figure 6:
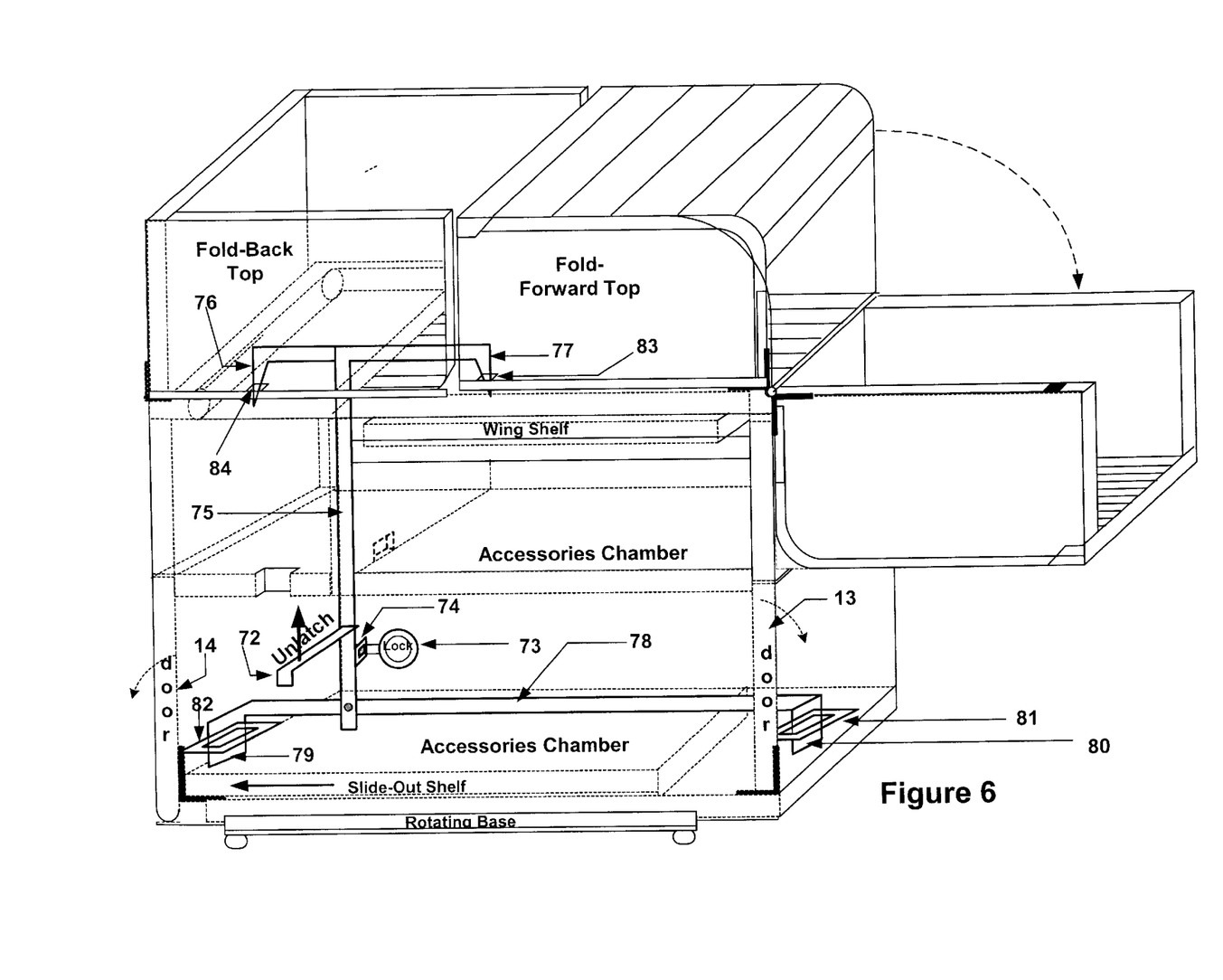
FIG. 6 is a perspective view of the enclosure showing latching and locking mechanisms.

In the preferred embodiment shown in FIG. 1 and FIG. 6, the rotating base 10 is implemented with a commercial cabinetmaker's "lazy susan" type assembly that contains internal roller or ball bearings as a rotational aid. The upper plane of the rotating base 10 is fixedly attached, such as with glue and/or screws, to the bottom surface of the enclosure 92, and in this way, the enclosure 92 is free to rotate continuously upon the base 10. The lower plane of the rotating base contains mounting holes which can be optionally used to fixedly secure bottom of rotating base to an external stand, table, or other surface.

FIG. 1 further depicts a slide-out shelf 11 capable of holding user-provided, housed electronic equipment 5, such as active presentation projector, active printer, or detachable active computer accessories, without external power or video cables. The slide-out shelf 11 is hidden and secured by front 13 and rear 14 access doors. The front access door 13 in the preferred embodiment is hingedly secured to the door 13 and to the base of enclosure 92. The rear access door 14 is hingedly secured, with a standard cabinetmakers' piano hinge or the like, to the door 14 and to the slide-out shelf 11. It is anticipated that other type or forms of hinging mechanisms, such as blind or hidden hinges could be used to achieve various cosmetic and cabinetry objectives. The slide-out shelf 11 is of conventional cabinetmakers' construction, and the sliding mechanism for extending and retracting the shelf is a standard cabinetmakers' full extension drawer slide or the like.

As shown in FIG. 6, the enclosure 92 is equipped with multiple interconnected latching mechanisms which can be jointly engaged in a single step by lowering a latch handle 72, and jointly unengaged by raising the latch handle 72. When latch mechanism is engaged by throwing vertical latch coupling member 75 downward, pushrod flanges 76 and 77 drop into securing eyelets 84 and 83 which are attached to hinged top covers 15 and 18; and pushrod flanges 79 and 80 drop into securing frames 82 and 81 which are attached to the lower doors 13 and 14. These pushrod flanges 76, 77, 79, and 80, eyelets 83 and 84 and securing frames 81 and 82 jointly secure closed covers lids, and doors without locking them. Locking can be implemented with a single locking frame 74 engaged by an integrated cam lock with locking pin 73, or alternatively with an external padlock or equivalent mechanism. The preferred embodiment shown is for illustration only; it is anticipated in this invention, that alternative shapes and constructions of flanges, frames, eyelets, and coupling members could be implemented with equivalent result. For example, the pushrod flanges 76, 77, 79, and 80 could be replaced by sheathed pushcable construction (such as is commonly found on bicycle gears and brakes) in which rigid but flexible cable housed in cable sheath, is used to force latching flanges attached to the ends of pushcables into mating eyelets.

Figure 2:
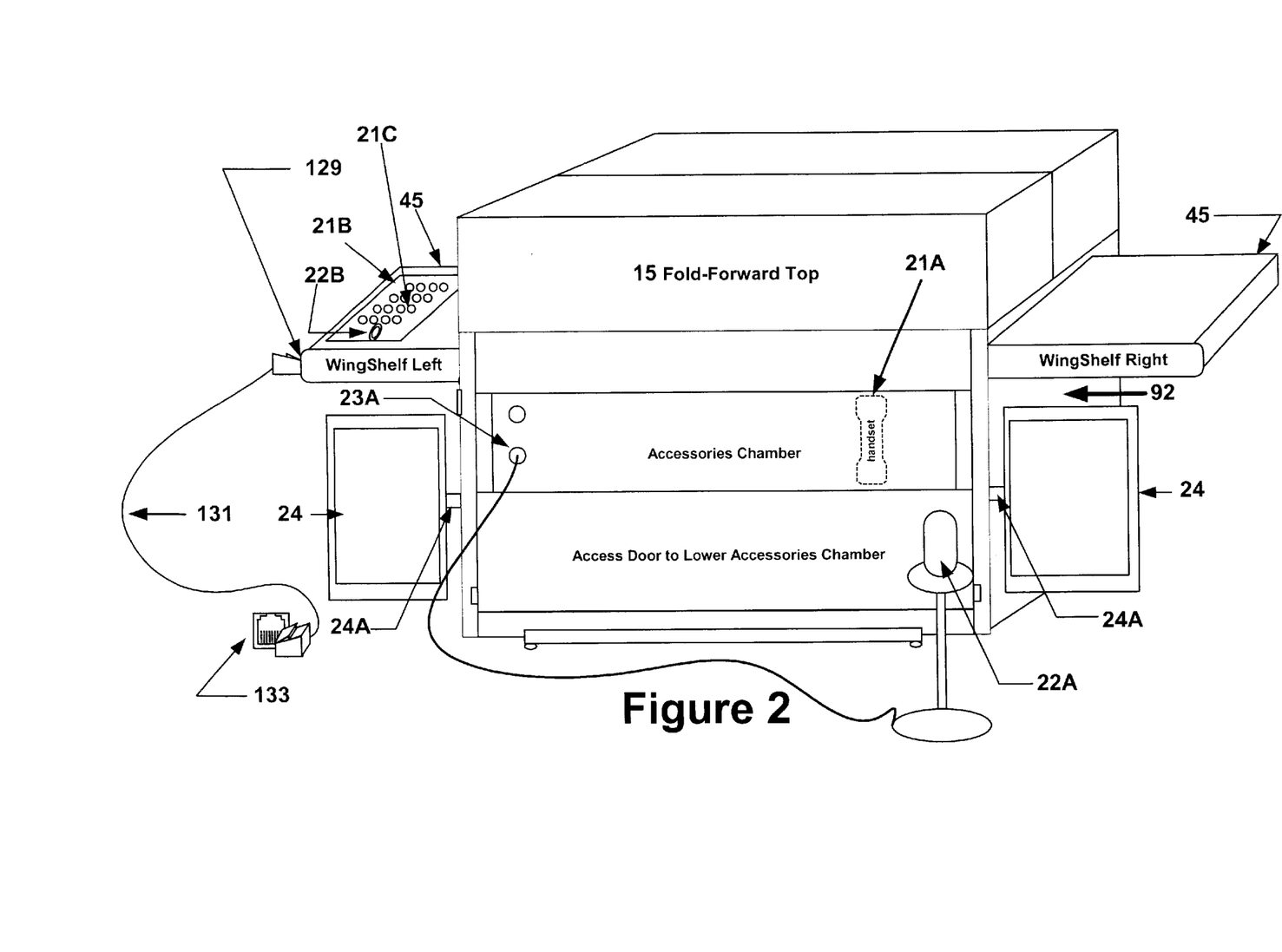
FIG. 2 is a front view of the enclosure showing the placement of a wing shelf, sliding shelf, telephone, audio components and access to work space.
Figure 7:
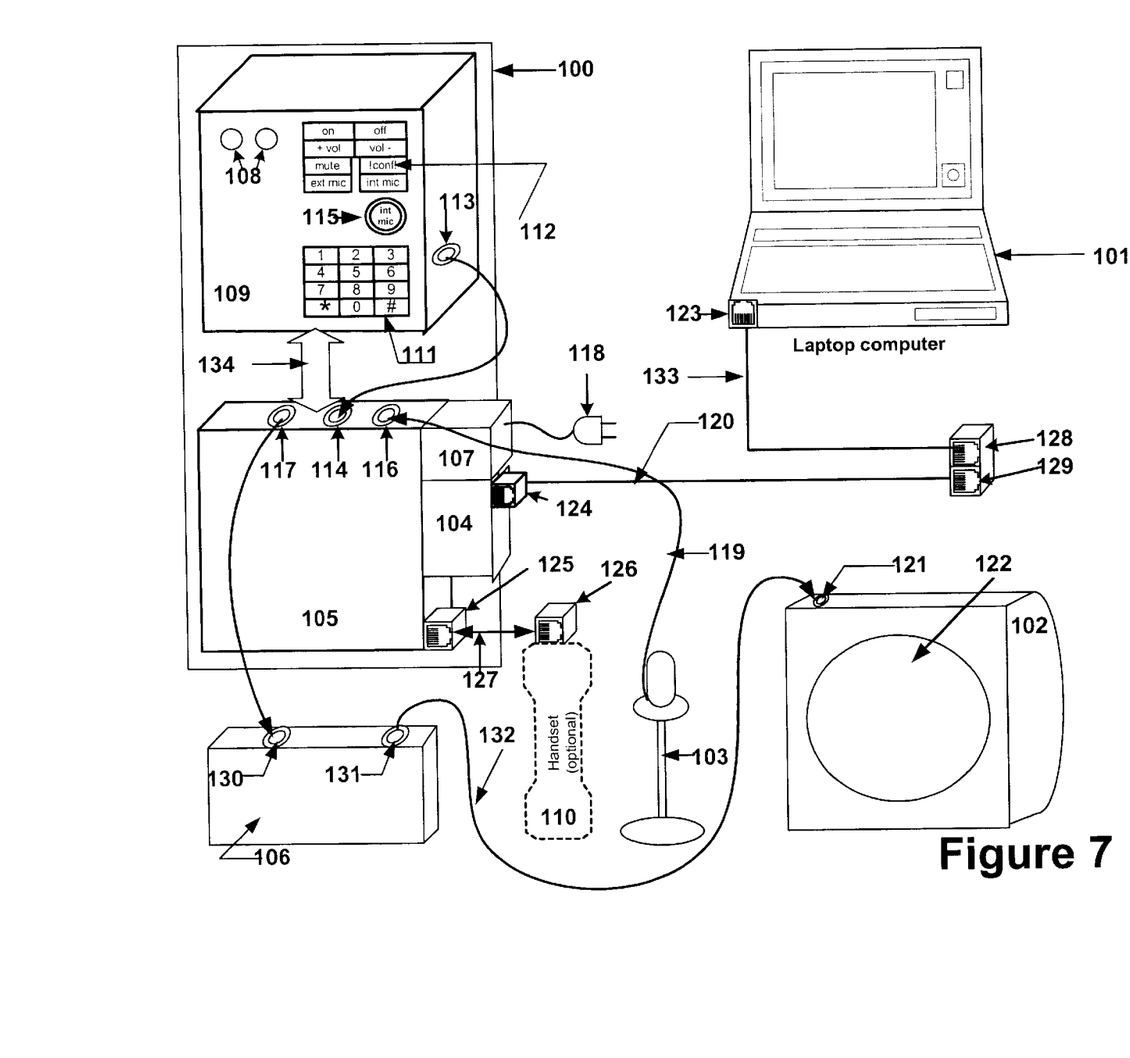
FIG. 7 depicts the configuration of the combination telephone-handsfree speakerphone.

FIG. 2 depicts the optional integrated combination telephone 21A and handsfree speakerphone 21B with external elements and connections, as further detailed in FIG. 7. FIG. 2 illustrates conventional dialing and answering either from handset or from handsfree speakerphone. The handset module 21A may be located on, or recessed within, the front of the enclosure 92 or recessed within the right-facing, external side of the enclosure 92 to avoid interference with the fold-forward 15 top of the enclosure 92. The telephone handset module 21A itself is optional if handsfree speakerphone is provided, and can be of conventional commercial design. A multitude of low cost handset designs in various forms, sizes, and cosmetic features are readily available from various manufacturers. For example, a commercial handset module 21A with integrated "repertoire autodialer" may be used, to facilitate automatic dialing of user preprogrammed telephone numbers.

The telephone module may alternatively or additionally be integrated as a handsfree speakerphone 21B. In the preferred embodiment shown in FIG. 2, the handsfree speakerphone is housed in left or right sliding wingshelf 45 to allow its use when workstation and enclosure may be closed and locked, and further to permit its implementation and retrofit installation as an optional feature of the workstation. Handsfree dialing and control keypad 21C, integrated microphone 22B, and modular telephone jack connector 129 are provided on various surfaces of one of the wingshelves 45 which together form portions of the handsfree speakerphone 21B. For example one connector 23A, internally routed to speakerphone, provides connection to optional external high compliance microphone; another connector 129 provides connection to the public switched telephone network 133, and a combination electrical and mechanical connector 24A provides connections for high fidelity detachable hanging speakers. It will be clear from further illustrations that, unlike most standalone desktop handsfree speakerphones, the handsfree speakerphone 21B included in this invention, is capable of accepting audio speakerphone input signals from an integrated microphone 22B and/or external high compliance microphone 22A and/or delivering audio speakerphone output through high fidelity external and/or detachable audio speaker housings 24, both of which features facilitate use in multiple attendee and reconfigurable professional conference room environments. Such integrated features differentiate the inventive enclosure from conventional standalone speakerphone units.

FIG. 7 illustrates the preferred internal embodiment and construction of the handsfree speakerphone 100. Candidate functions for integration into the wing shelf (45 in FIG. 2) are shown inside the speakerphone housing 100 which, in a preferred embodiment, may be the same as the wing shelf housing. Other embodiments are anticipated. For example, AC/DC power supply 107 and/or telephone line interface module 104 may, in order to simplify agency approvals for safety, electromagnetic emissions, and telephone network (FCC part 68 in the U.S.), be implemented in separate modular form external from the speakerphone housing 100 but internal to the enclosure (92 in FIG. 1). Detailed descriptions of specific internal electronics functions and processes is not the subject of the current invention, as all electronic functions and processes are implemented in the preferred embodiment with standard functional modules which can be independently designed. Furthermore, most modules utilized in the present invention can be procured commercially from a limited number of specialized communications equipment vendors, customized into reasonable size and form factors and with input/output connectors suitable for further integration.

As shown in FIG. 7 the handsfree telephone module 100 contains user accessible control panel 109 with keypad 111, switches 112, status lights 108 internal microphone 115 and internal microphone output 113; speakerphone module 105 with external 116 and internal 114 microphone inputs and speaker output 117 which may be further amplified and spectrally shaped; AC/DC power supply module 107 optionally with its own AC plug 118; telephone line interface module 104 with standard 6-pin, 2 or 4 conductor modular jack public switched telephone network connector (124, equivalent to 129 in FIG. 2); and 4-pin modular jack interface 125 to optional external handset 110 for individual or private conversations such as may be conducted at the start of a conferencing meeting, or intermittently during conferencing meetings.

A dual tone multifrequency dialing keypad 111 provides conventional tone dialing for establishing conferencing connections over the public switched telephone networks. An array of special function buttons 112 realize "repertoire dialing," volume control, mute, on/off hook, internal/external microphone, etc such as is commonly available in such conference telephones.

The speakerphone module 105 is a complex signal processing electronic system which enhances simultaneous two-way telephone communications over microphones and speakers in the presence of interfering electrical and acoustical distortions, such as echoes which would otherwise severely impair handsfree telephone operation. It also provides signal gain and attenuation, combines audio sources such as multiple microphone channels and telephone line signals, and controls keypads, switches, and indicators. Specifics of the speakerphone module or its internal operation are not the subject of this invention. The speakerphone module 105 has a multiple conductor connecting cable 134 with which it interrogates and signals the control panel 109.

It further contains an external microphone input connector 116 which is connected to relocatable high compliance external microphone 103 by shielded audio connecting cable 119.

The speakerphone module 105 also contains an electrical output audio connector 117 which is coupled to a corresponding input connector 130 on a separate embedded audio amplifier or amplifier/mixer 106 through an internal electrical connecting cable. The amplifier output connector 131 is internally connected to speaker input connectors 121, through which it drives high fidelity, low impedance speakers 122 housed in external or detachable audio speaker housings 102 in which mounting and electrical connection to the speakers is accomplished without tools, in a single operation. These improved speakers are the subject of and are fully described in a separate U.S. patent application.

The telephone line interface module 104 provides electrical interface between the public switched telephone network and speakerphone module, including AC and DC impedance emulation; telephone loop closure, release, and timing; and signal scaling. Its operation is subject to country-specific requirements and per-implementation formal certification, and internal operation or implementation of the telephone line interface module is not the subject of the current invention. Because of the rigid specifications and expensive, lengthy certification process, the telephone line interface module 104 may be separately mounted within the enclosure 92. However, in the preferred embodiment shown, the speakerphone module interfaces to the public switched telephone network, typically at a wall mount modular jack 129, through standard telephone line cord 120 which connects to speakerphone module standard modular jack 124.

In the fashion just described, the preferred embodiment effectively integrates the handsfree speakerphone 100, while providing both high power, high fidelity speakers 122 located in repositionable external or detachable audio speaker housing 102 and high compliance, repositionable external microphone 103.

Also illustrated in FIG. 7 is a computer terminal 101, preferably a laptop computer, having a modular telephone network jack 123 as is typically provided in such products. This computer 101 and modular jack 123 can be used for computer "modem" connections over the public switched telephone network, independently of operation of the handsfree speakerphone 100. The computer modem is shown connected by a standard telephone extension cable 133 to the public switched telephone network modular jack 128, typically wall mounted in the user facility. This computer-modem-telephone network connection is shown to add understanding of the independent multimedia nature of the functions provided by and facilitated by the inventive enclosure.

As shown in FIG. 2, the preferred embodiment includes at least one single left-and-right sliding wing shelf 45 mounted in the enclosure 92, which when extended outward from the enclosure 92, provides a user-accessible work surface. The wing shelf 45 as used in the preferred embodiment is further illustrated in FIGS. 5A and 5B.

Figures 5A, 5B, 5C:
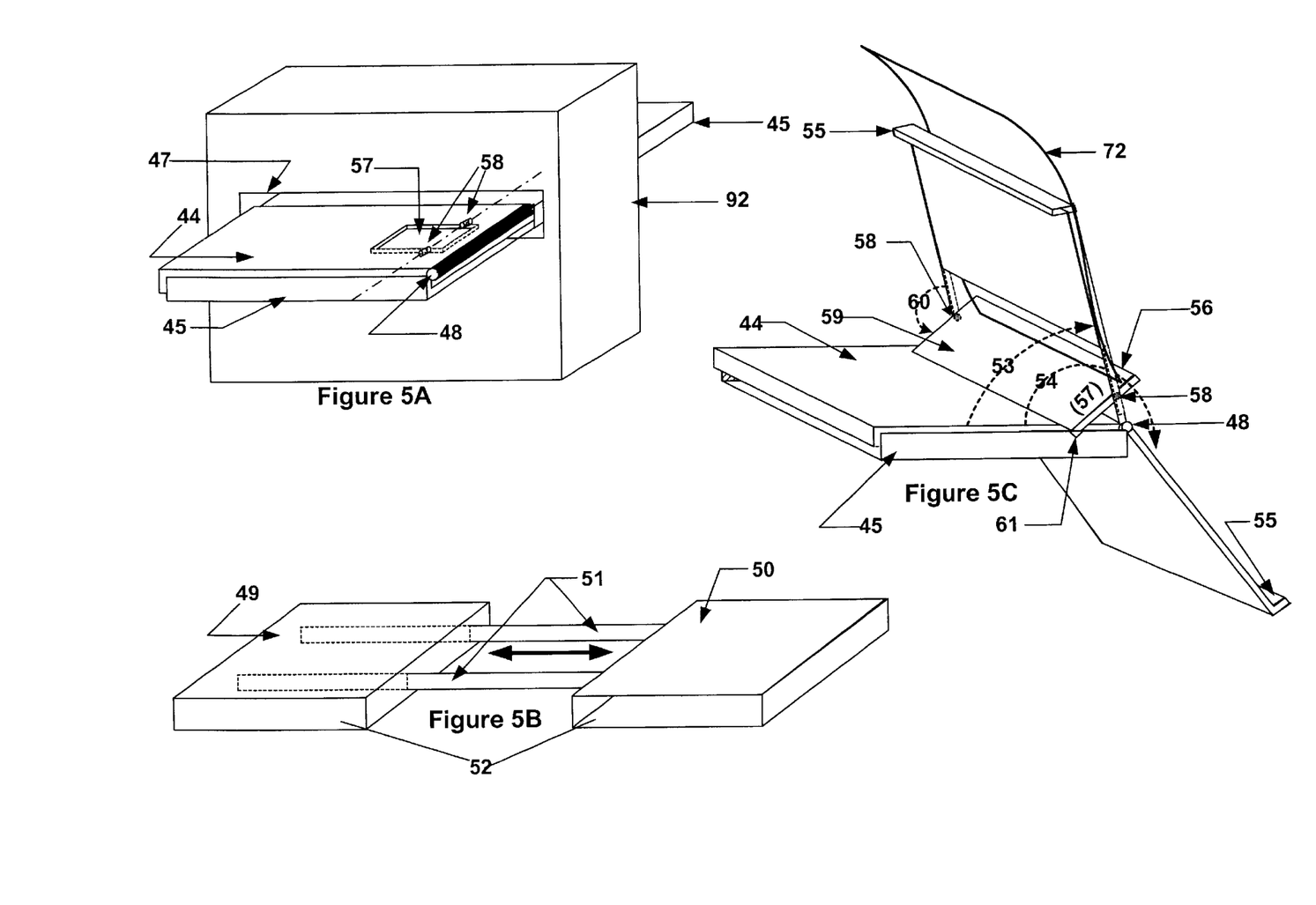
FIGS. 5A, 5B and 5C are various side and perspective views showing embodiments of a wing shelf and optional note tray.

FIG. 5A illustrates a fixed wing shelf assembly 45 extending completely through exterior openings 47 on opposite sides of the enclosure 46 which is hollow in the volume occupied by the sliding wing shelf 45. It is clear from this illustration that the fixed wing shelf assembly 45 can slide outward or inward on either side, to provide longer external extension on one side, and a simultaneously shorter external extension on the other side of the enclosure 46. The fixed wing shelf assembly can be constructed from solid material (wood, plastic, composite), or it may be formed sheet metal in which case integrated electronics such as hands-free speakerphone may be included inside the wing shelf, as was previously described. It is anticipated that an alternative embodiment could be configured with additional or alternative wing shelves that extend out from the "front" and "back" of the enclosure 46.

Furthermore, the invention may be characterized with a single, split-wing shelf assembly 52 capable of simultaneous left and right extension from opposite sides of the enclosure 46 walls. In FIG. 5B, the split-wing shelf 52 is composed of at least two sections 49, 50 joined by embedded sliding members 51, such as wooden or metal rods. These sliding members 51 allow the sections 49, 50 to be extended away from each other, permitting the split-wing shelf 52 to simultaneously extend further outward from the enclosure 92 on both sides. The length of the split-wing shelf 52, when the two split sections are pushed together or closed, is approximately equal to the corresponding depth of the enclosure 46. In this way, when the split-wing shelf 52 is closed, its outer facing ends are approximately flush with the outside surfaces of the enclosure 46, creating a hidden shelf. When the split-wing shelf 52 is pulled apart or opened, the two sections of the split-wing shelf extend outward from either or both sides of the enclosure 46 to create one or two external shelves. It is also anticipated that the split-wing shelves 52 could be mounted on drawer slides or the like to facilitate movement of the shelves. It is an element of this invention that if shelf 50 is everywhere slightly larger in cross section than, and "envelopes" the opposite shelf 49 when closed, then each wing shelf can extend outward from enclosure nearly the full width of the enclosure.

Also illustrated in FIG. 5A and further detailed in FIG. 5C, is a hinged, rotating note tray 44 which is shown attached and hingedly affixed to one of the extended sides of the wing shelf 45. The note tray 44 is configured to pivot about its primary hinge 48 for movement among a storage position, an upper position and a lower position. In the storage position illustrated in FIG. 5A, the note tray 44 is recessed into the top surface 47 of the wing shelf 45, such that the surface of the note tray 44 is horizontal and approximately flat. The recessing of the note tray 44 into the top surface 47 of the wing shelf 45 permits the use of that surface as shelf or writing surface, and further permits the wing shelf 45 to slide into the enclosure 92 for out-of-sight storage. FIG. 5C further illustrates the upper position 53 in which the note tray 44 provides a note holder 55 above the wing shelf 45, and the lower position 54 in which the note tray 44 provides a note holder below the surface of the wing shelf 45.

Lips for holding papers 72 or the like are provide in both Upper 53 and Lower 54 Positions. Lower position lip 55 is formed by the non-hinged edge of the note tray 44 which is bent at approximately a 90 degree angle to the surface of the note tray 44. Upper position lip 56 is formed by a rotating panel 57, as also shown in FIG. 5A, mounted in a cutout area on the surface of the note tray 44. The rotating panel 57 swivels 60 around two pivots 58 which also serve to secure the rotating panel 57 in the note tray 44. The pivots 58, which for example could be spring-loaded telescoping intermating cylinders (such as those frequently used to secure a watch band to a wristwatch), each extend into the adjacent edges of the rotating panel 57 and the note tray 44. The rotating panel 57, when opened, creates an extension 56 on the front side of the note tray 44 which serves as the upper position lip 56. The rotating panel 57, when opened, creates an extension 59 on the back side of the note tray 44 which drops into a notched channel 61 on the surface of the note tray 44 and serves as a support for holding the note tray 44 at a convenient note-taking angle (approximately 65 degrees) relative to the surface of the wing shelf 45.

As illustrated in FIGS. 5D through 5G, other embodiments are anticipated for a note tray 44, which is composed of at least two sections and joined by a rotating hinge 63, and which is mounted in an opening 47 in an enclosure 46 or in a shelf, such as the wing shelf 45. In addition to the present invention, such a note tray embodiment is applicable for use in desks, tables, benches, and workstations. In the embodiments shown, the note tray 44 contains a bent rigid panel 66 whose ends 67, 68 are bent to form lips for holding notes or papers. The rigid panel 66 is connected by a rotating hinge 63 to a securing panel 69 that remains, at least partially, within the enclosure 92 or the shelf 65 when the note tray 44 is pulled out and rotated for use. The note tray 44, when rotated to the horizontal position, can be fully inserted into the opening 47 in the shelf 65 or the enclosure 92 to hide and store the note tray 44 when not in use. The note tray 44 can be extended outward from the opening 47 and rotated to a convenient upper position 70 for holding notes or papers. As illustrated in FIGS. 5F and 5G, the note tray 44 can be completely removed from the enclosure 92 or shelf 45, rotated 180 degrees and reinserted to form a note tray 44, which when extended, rotates downward to create a lower position 71 for the note tray 44.

Figure 3A:
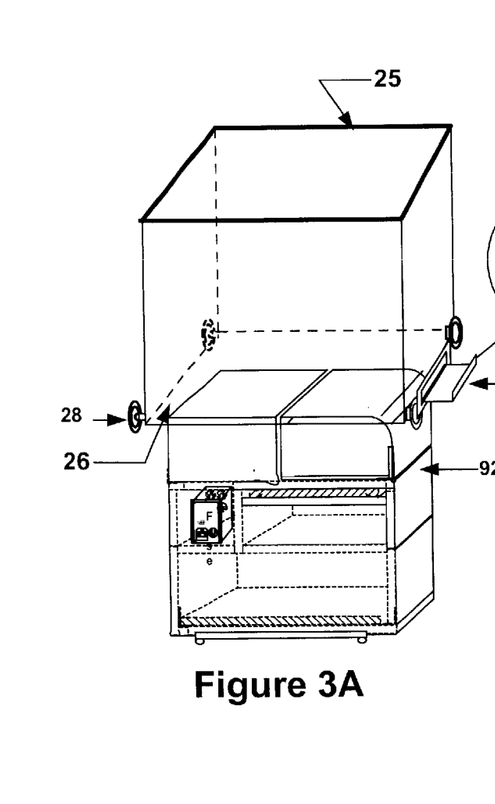
FIGS. 3A, 3B, and 3C are perspective views depicting the enclosure in a typical application, mounted on a variable-height rolling cart or stand, which additionally serves as an intermating container stand.
Figure 3B:
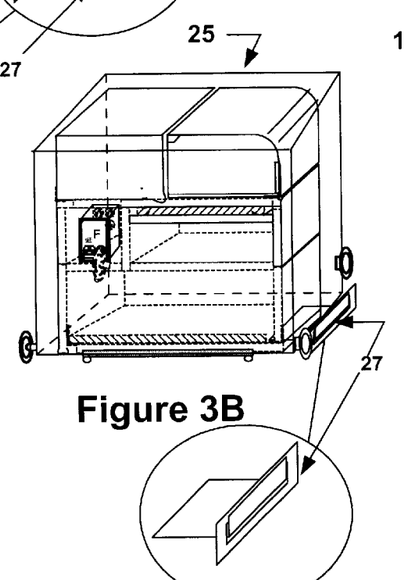
Figure 3C:
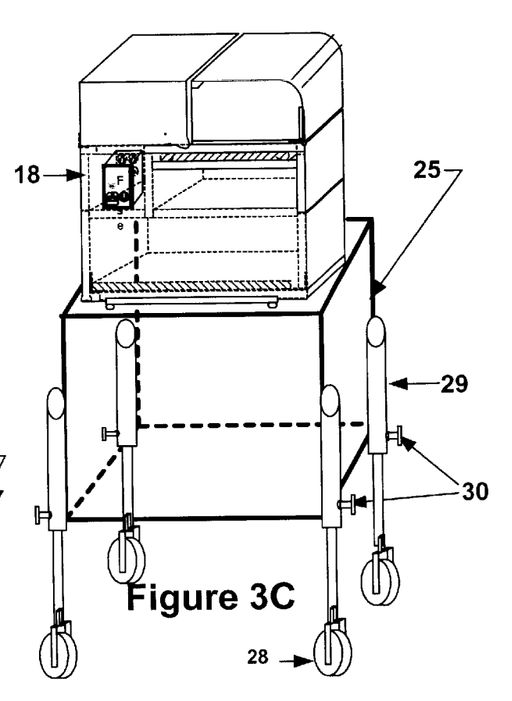

FIG. 3C illustrates a typical mounting configuration for the workstation. An external, height-adjustable roll-about cart 25 as shown, allows the workstation to be used in standing or sitting position, and to be easily moved from location to location. The cart 25 is larger everywhere in internal cross section than the outer dimensions of the enclosure 26 and can therefore be used as a transport container when wheels 27 are fully recessed or removed.

As illustrated in FIGS. 3A, 3B, and 3C, a combination shell, such as an electronics enclosure, and an intermating rigid, reinforced shell stand and transport container ("container stand") 25 is configured to cover and provide mobility for the enclosure 92. The container stand 25 consists of a metal, plastic, wooden, or composite, hollow, five-sided shell, that is open at one end 26 and sized to envelope, house, protect, and secure the enclosure 92 when it is not in service. Optionally, the shell of the container stand may be lined or padded with a soft inner surface lining. The container stand 25 provides inherent protection for the finished surfaces of the enclosure 92 by virtue of a precise fit between the enclosure 92 and the lined or padded internal surfaces of container stand 25.

The container stand 25 is open at one end to allow it to easily slip over the enclosure 92 in a single operation. The enclosure 92 is secured within the container stand 25 with up to four integrated metal securing flanges 27 which slide into slots 20 along the bottom edges of the open end and under the outer bottom edges of the enclosure 92. These flanges 27 (only one of which is shown in FIGS. 3A and 3B, in unsecured and secured positions respectively), form an internal bottom "edge" for securing the enclosure 92. The top surfaces of the flanges 27 may be optionally covered with a non-abrasive finish, such as Teflon or other material, to protect the bottom edges of the enclosure 92 and to reduce the sliding friction for flange 27 insertion and removal.

The outer dimensions of the container stand 25 are necessarily larger than the "footprint" of the enclosure 92 and any outside extremities thereof, because the container stand 25 is sized to fit over and to fully enclose the enclosure 92. The container stand 25, when separated from the enclosure 92, can be used as an in-service stand or cart (see FIG. 3C) suitable for positioning the enclosure 92 at convenient, in-service height or elevation. The container stand 25 may optionally include casters or wheels 28 extending downward from its open end, for easy movement of the enclosure 92 either when covered or when in-service. The aforementioned container stand 25 configured as an in-use cart or stand employs four attachable legs or integrated telescoping legs 29. The legs 29 are positionable into fixed or variable heights or "stops" and securable into position with pins, thumbscrews 30 or the like. It is anticipated that wheels or casters 28 would optionally be inserted into the bottom ends of legs 29 to create a rolling or moveable cart.

Figure 4A:
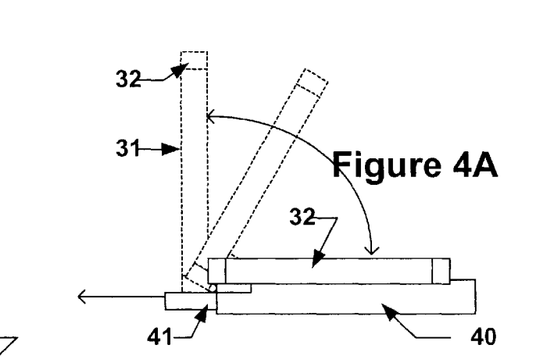
FIGS. 4A, 4B, 4C, 4D, and 4E comprise various views of the projection screen and supportive frame and illustrate attachment to the enclosure via a sliding arm assembly.
Figure 4B:
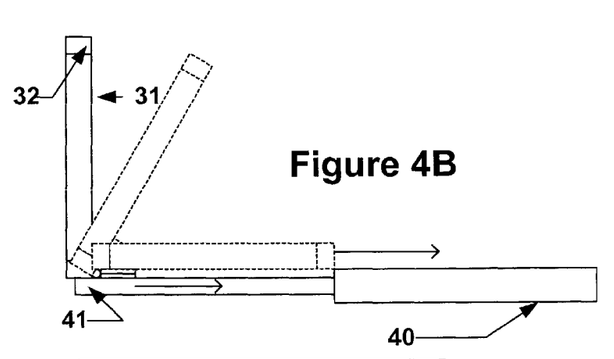
Figure 4C:
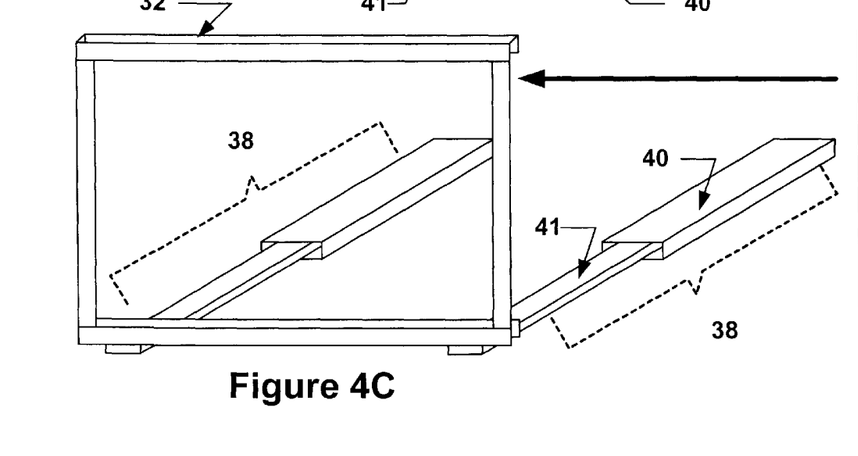
Figure 4D:
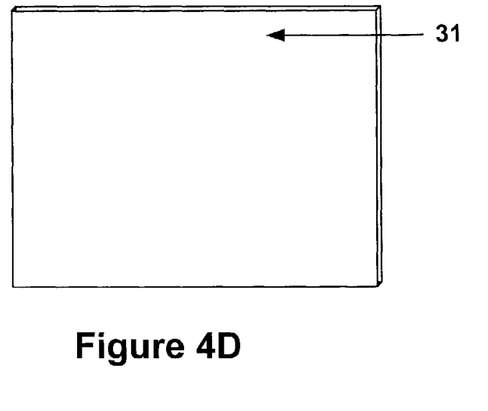
Figure 4E:
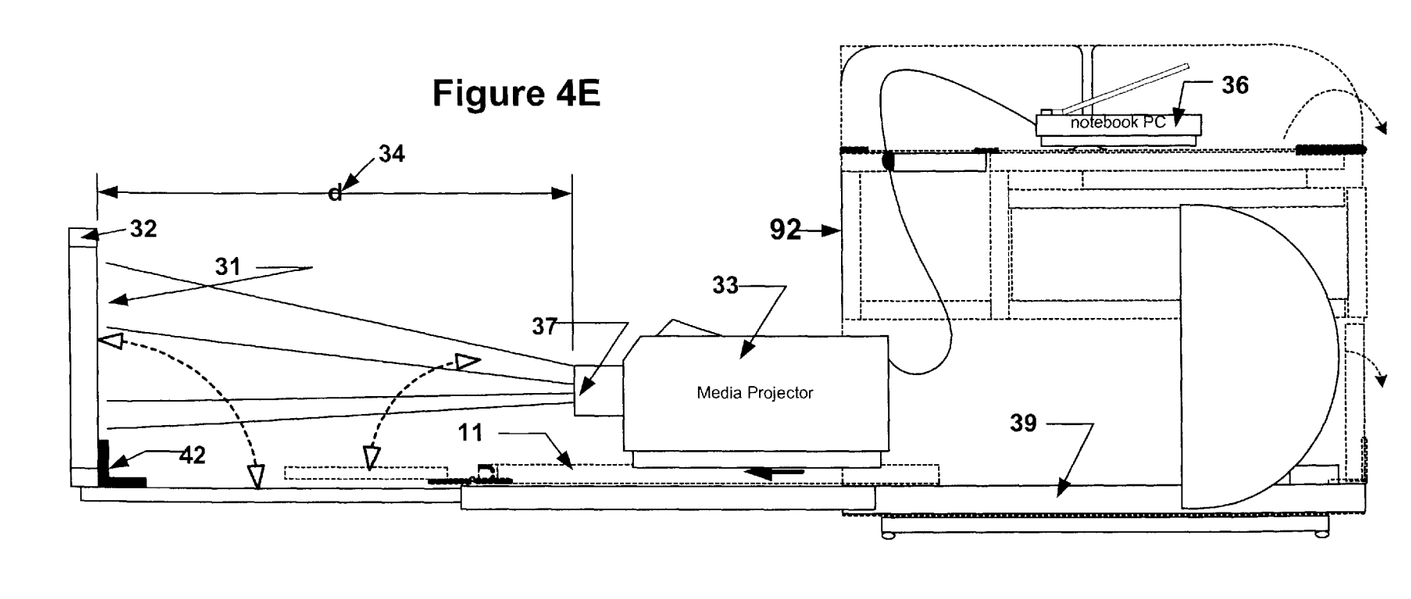

As illustrated in FIGS. 4A, 4B, 4C, 4D and 4E, the enclosure 92 is configured to include an integrated or attachable miniature backlit projection screen 31 and integrated or attachable rigid frame 32 for holding a separate backlit projection screen 31. Such a screen 31 is typically a thin translucent sheet structure that is illuminated from one side (back side) and transmits the incident light out the other side (front side). The screen 31 also incorporates emissions and focusing characteristics to improve the brightness and viewing angle from front side of the screen 31. Many commercial sources exist for such screens and screen material, and the composition of the screen is not a subject of this invention. Furthermore, most modern digital projectors have a display mode that will invert the transmitted image for displaying on backlit screens, to prevent the image from being displayed as inverted from the original recordings. This screen 31, when illuminated from an enclosure-mounted, short-throw media or video projector 33 driven from an enclosure-mounted, media player (such as a CD ROM player or a streaming media-compatible personal computer 36), creates an integrated electronic viewstation, the preferred embodiment of which is illustrated in FIG. 4E. The screen 31 or frame 32 for a screen is attached to the enclosure 92 or to a slide-out shelf 11 of the enclosure 92 in fixed or variable positions, which are orthogonal to and spaced away from the projector lens 37 (at a distance (d) 34 equal to or greater than the minimum projector short-throw image focusing distance).

In the preferred embodiment illustrated in FIGS. 4A through 4E, a rigid frame 32 is mounted on and hinged to a telescoping mounting arm assembly 38 which in turn is mounted to or attached to the base 39 of the enclosure 92, below a sliding shelf 11. The sliding shelf 11 is independent of the telescoping arm assembly 38, and allows a media projector 33 to be extended outward from the enclosure to improve convection airflow, to permit configuration of and service to the projector 33, and to adjust the distance (d) 34 between the projector lens and the backlit projection screen 31. The telescoping arm assembly 38 is comprised of a larger, hollow, arm 40 within which slides a smaller arm 41. The smaller arm is attached by a hinge 42 to the rigid projection screen frame 32. This hinge 42 allows the rigid frame 32 to fold down, on top of the larger arm 40, and forms a compact composite arm-frame assembly which can slide into the base 39 of the enclosure 92 for hidden storage when not in use. In the preferred embodiment shown in FIGS. 4D and 4E, the backlit projection screen 31 is a rigid or semi-rigid panel that slides into the rigid screen frame 32 and permits easy replacement of the screen 31 is worn or damaged. In an alternative embodiment, the screen may be of "venetian blind" roll-out, spring retracting design.

It should be emphasized that the above-described embodiments of the present invention, particularly, any "preferred" embodiments, are merely possible examples of implementations, set forth only for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A compact and configurable workstation and enclosure, comprising:

a multi-sided hollow enclosure defined by a plurality of interior chambers and levels, accessible through a plurality of doors and openings in said enclosure;

said interior chambers being configured so as to comprise a single accessories chamber on the bottom level of said enclosure, dual chambers on the middle level of said enclosure wherein a first of said dual chambers is a chamber defined for housing power and cable components and a second of said dual chambers being configured to house and interconnect various electronic accessories, and split front and rear sections on the top level of said enclosure;

said bottom level accessories chamber configured with a slide-out shelf, and a front and a rear doors affixed at each opposing end of said bottom level chamber for providing access to said slide out shelf and said bottom level accessories chamber;

said middle level power and cable component chamber integrated with a power module and an interior chamber access door along the top side of the power and cable component chamber;

said split top sections having a front section and a rear section;

an opening between said middle level and said upper level defining a position for a slide-out wing shelf;

a latching mechanism for latching and locking said sections and said doors of said enclosure; and a base attached to the bottom side of said bottom level of said enclosure which facilitates positioning and attachment of said enclosure.

2. The workstation and enclosure of claim 1, wherein the front split top section further comprises a hollow four-sided cover which is hingedly affixed along a front edge of one side of said enclosure to permit said front split top section to fold forward.

3. The workstation and enclosure of claim 2, wherein the front split top section is configured to cover a primary interior work surface when said split top section is closed, and to uncover said primary interior work surface and create a secondary work surface, that is in front of and below the primary interior work surface, when said split top section is folded forward.

4. The workstation and enclosure of claim 2, wherein the front split top section provides a suitable mounting surface and sufficient internal height when closed to house a combination control keyboard-display device.

5. The workstation and enclosure of claim 1, wherein the rear split top section is optionally hingedly affixed along one rear edge to permit said rear split top section to fold backward.

6. The workstation and enclosure of claim 5, wherein the rear split top section is configured to provide access to (when open) and cover (when closed), an interior chamber access door to said power and cable containment chamber.

7. The workstation and enclosure of claim 1, wherein the power and cable containment chamber is separated from the primary interior work surface by an interior chamber access door which is hingedly or removably positioned to permit access to said power and cable containment chamber.

8. The workstation and enclosure of claim 7, wherein said interior chamber or its mating access door is configured with a compressible cable securing gasket along one edge, said gasket aiding in the placement and holding of multiple and varied electrical interconnecting cables positioned along said gasketed edge between said interior chamber and said access door.

9. The workstation and enclosure of claim 1, wherein said integrated power module is designed to distribute a.c. power from an external a.c. power source to a.c. power connectors accessible from multiple internal chambers.

10. The workstation and enclosure of claim 9, wherein said integrated power module also provides overvoltage and overcurrent protection to workstation-powered equipment.

11. The workstation and enclosure of claim 9, wherein said integrated power module is equipped with external power-on or power-available indicator lights, and an external switch to enable or disable power flow to the module.

12. The workstation and enclosure of claim 9, wherein said integrated power module is equipped with an externally facing a.c. power connector for external electronic equipment powered from the workstation.

13. The workstation and enclosure of claim 1, wherein said internal power and cable containment chamber is configured with internal ducts or openings between said power and cable containment chamber and any other interior chambers of said enclosure, said ducts or openings permitting wholly internal routing of power cords and connection cables for connecting a plurality of electronic equipment with said power module and for interconnecting wholly internal electronic equipment.

14. The workstation and enclosure of claim 1, wherein said hollow enclosure and said multi-sides and said chambers are constructed from formed and joined sheetmetal, to which can be separately attached, removed, and replaced, individual outward-facing cosmetic panels of various materials, finish, weight, and design.

15. The workstation and enclosure of claim 1, wherein said latching mechanism comprises multiple interconnected latches which are jointly engaged or disengaged by a single latch handle.

16. The workstation and enclosure of claim 1, wherein said latching mechanism is employed by the interaction of a series of interconnected pushrod flanges or pushcable flanges with corresponding mating eyelets attached to said front and rear top sections and securing flanges attached to said front and rear doors.

17. The workstation and enclosure of claim 1, wherein said latching mechanism further comprises a locking mechanism employed by engaging an integrated cam lock with locking pin or by application of an external lock.

18. The workstation and enclosure of claim 1, wherein said integrated base further comprises a rotating bearing or friction plate assembly with bottom member fixable to external horizontal surface, and upper member fixable to bottom of said enclosure.

19. The workstation and enclosure of claim 18, wherein said integrated base rotates on said bearing or friction plate assembly such that said enclosure is rotatable plus and minus 180 degrees and capable of arbitrary placement in the rotational plane by a user.

20. The workstation and enclosure of claim 1, wherein said slide out shelf is configured to hold user-provided electronics equipment within the interior of said bottom chamber and to extend beyond the perimeter of said enclosure, and wherein said slide out shelf is hidden and secured by said front and rear doors affixed at opposing ends of said bottom chamber.

21. The workstation and enclosure of claim 1, wherein said front bottom chamber door is hingedly affixed to the base of said enclosure.

22. The workstation and enclosure of claim 1, wherein said rear bottom chamber door is hingedly affixed to said slide out shelf, such that it folds down as the slide out shelf is extended from said enclosure.

23. The workstation and enclosure of claim 1, wherein said wing shelf is defined as an alternately left-and-right sliding wing shelf, extendable through opposite sides of said enclosure through said exterior openings between said middle and upper level chambers.

24. The workstation and enclosure of claim 1, wherein said wing shelf is defined as a split wing shelf comprised of at least two sections joined by sliding members, said sliding members connecting said sections of said split wing shelf and permitting the split sections to be pulled apart or pushed together to form simultaneous left-and-right extending external wing shelves of varying widths.

25. The workstation and enclosure of claim 24, in which the cross-section of said first split section is larger than cross-section of said second split section, thereby enveloping said second split section when pushed together, and permitting each section, when pulled apart to extend outward from edge of enclosure more than half the width of enclosure.

26. The workstation and enclosure of claim 1, wherein said wing shelf contains electronic circuitry, connectors, and/or interconnecting cables.

27. The workstation and enclosure of claim 1, wherein said wing shelf is configured with a note tray.

28. A compact and configurable workstation and enclosure, comprising a plurality of chambers for housing different devices;

an audio amplifier-mixer housed in a first chamber;

a power distribution module housed in a second chamber;

a left-and-right sliding wingshelf;

a speakerphone assembly; and detachable audio speakers.

29. The workstation and enclosure of claim 28, wherein said handsfree speakerphone comprises external relocatable microphone and external speakers which are electrically and mechanically connectable to and detachable from the exterior of said enclosure.

30. The workstation and enclosure of claim 28, wherein substantial portions of said speakerphone assembly, are mounted within said wing shelf.

31. The workstation and enclosure of claim 30, wherein a dialing pad for said speakerphone assembly is mounted within said wing shelf.

32. The workstation and enclosure of claim 28, wherein said handsfree speakerphone utilizes said amplifier and said detachable audio speakers to amplify and playback output audio channel of said handsfree speakerphone.

33. A compact and configurable workstation and enclosure, comprising a plurality of chambers for housing different devices;

an audio amplifier-mixer housed in a first chamber a power distribution module housed in a second chamber;

detachable audio speakers; and a projector and a screen assembly housed in a third chamber.

34. The workstation and enclosure of claim 33, wherein a short throw (less than 1 meter focal length) rear-projection projector of said projector and screen assembly is contained within the interior of said enclosure on a slide out shelf.

35. The workstation and enclosure of claim 33, wherein said projector and screen assembly is configured with a screen or frame for a screen attached to said enclosure.

36. The workstation and enclosure of claim 35, wherein said projector and screen assembly comprises a frame mounted on and hinged to a telescoping mounting arm assembly, said mounting arm assembly being attached to said enclosure.

37. The workstation and enclosure of claim 35, wherein said projector screen or frame for screen is hingedly attached to a telescoping arm assembly, such that said screen or frame for screen may be folded flat on top of said telescoping arm assembly and stored in the base of said enclosure when not in use.

38. The workstation and enclosure of claim 33, wherein said projector and screen assembly is independently configured from a slide out shelf such that the distance between a projector located on said slide out shelf and a projector screen attached to said enclosure via a telescoping arm assembly may be adjusted.

39. A method for housing, powering and interconnecting multiple mixed media electronics without reconfiguration, comprising the steps of:

inserting integrated or user-provided electronic equipment into appropriate chambers in an enclosure;

connecting all of said electronic equipment to a power module contained internal to said enclosure, and connecting said power module to an external power source;

making and configuring all appropriate connections between said pieces of electronic equipment; and maintaining and storing said electronic equipment within said enclosure without deconfiguring or disconnecting internal electrical or other connections between said pieces of electronic equipment contained within said enclosure.

40. The method of claim 39, further comprising the step of securing said electronic equipment within said enclosure by engaging a single latching and locking mechanism to latch and lock multiple chambers.

41. The method of claim 39, further comprising the step of transporting said enclosure by attachment of a wheeled container stand.

42. The method of claim 41, further comprising the step of creating a variable height wheeled container stand for transporting and using said enclosure by attachment of height-positionable legs.

43. A compact and configurable workstation and enclosure, comprising:

a multi-sided hollow enclosure defined by a plurality of interior chambers and levels, which are accessible through a number of exterior doors and an interior access door;

said enclosure being further defined by exterior openings in opposed sides of exterior walls of said enclosure;

a wing shelf assembly extending through said opposed openings and thus occupying volume of interior of said enclosure between said openings;

said wing shelf assembly configured to slide from side to side through opening;

said wing shelf assembly sized such that it fits approximately flushly within the external walls of said enclosure when not extended.

44. The workstation and enclosure of claim 43, wherein said wing shelf assembly has interior assembly containing electronic components, circuits, or connectors.

45. The workstation and enclosure of claim 44, wherein said wing shelf is a split wing shelf comprised of two shelf sections joined by embedded sliding members, permitting separate or simultaneous extension of said split wing sections from opposed sides of said enclosure.

* * * * *